(No Model.)
G. M. WALLACE.
WAGON LOADER.
No. 550,426. Patented Nov. 26, 1895.
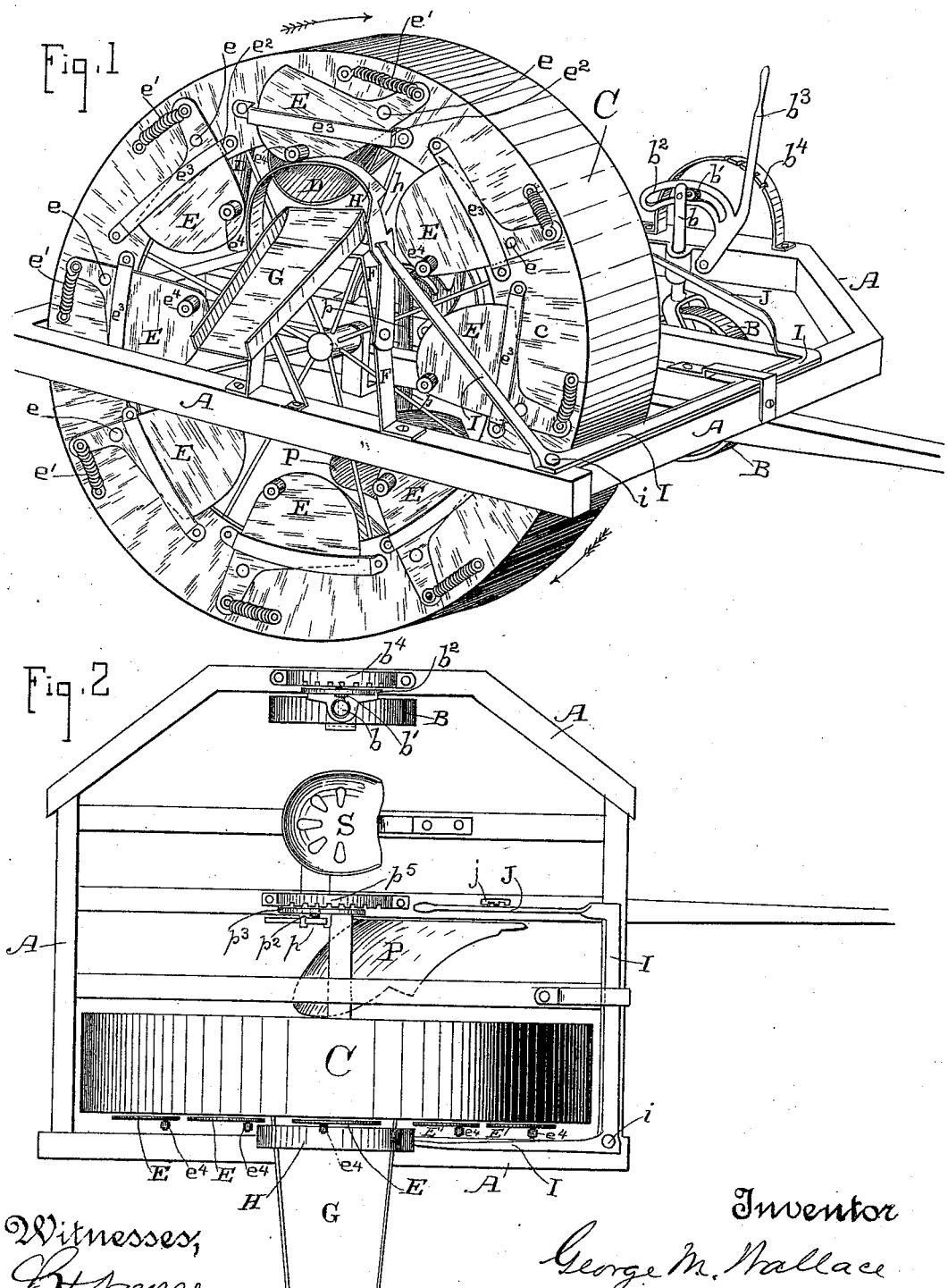
Witnesses,
B. H. Rouse
J. A. Bayless
Inventor
George M. Wallace
By Dewey & Co.
Attys (No Model.) 2 Sheets—Sheet 2.
G. M. WALLACE.
WAGON LOADER.
No. 550,426. Patented Nov. 26, 1895.
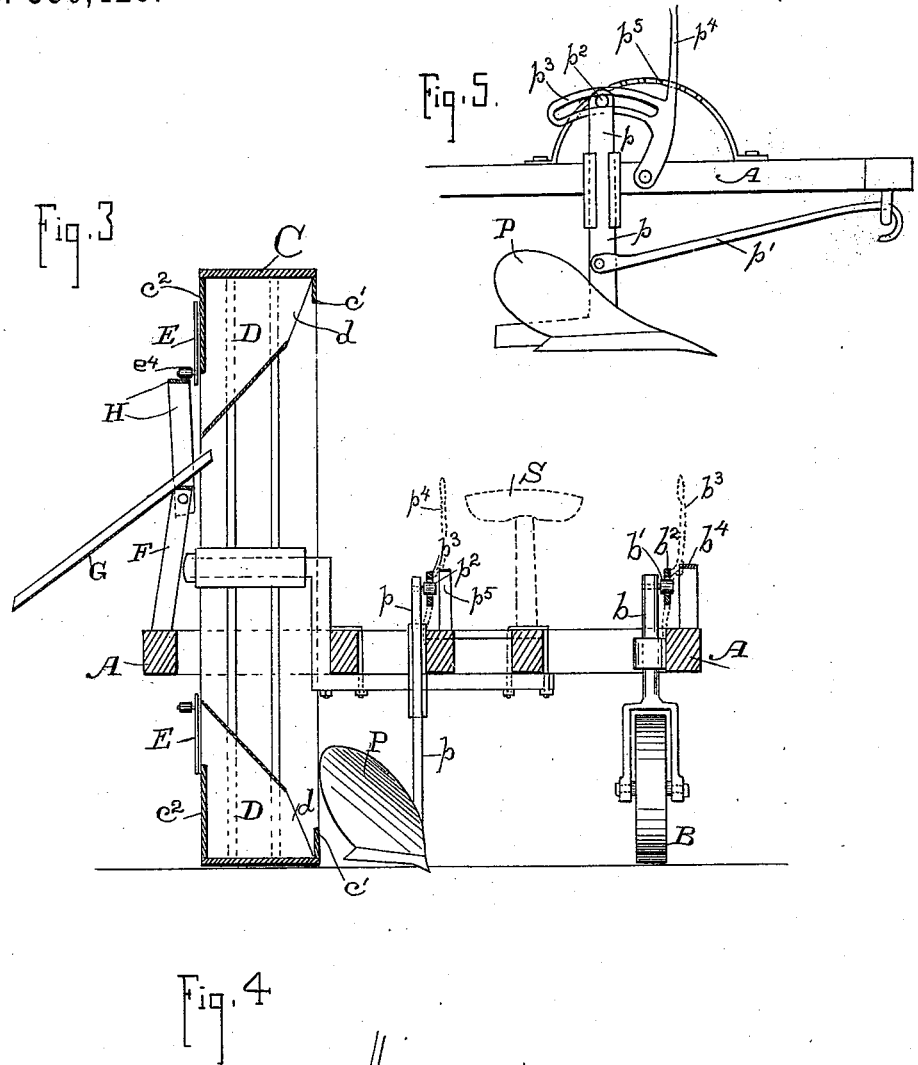
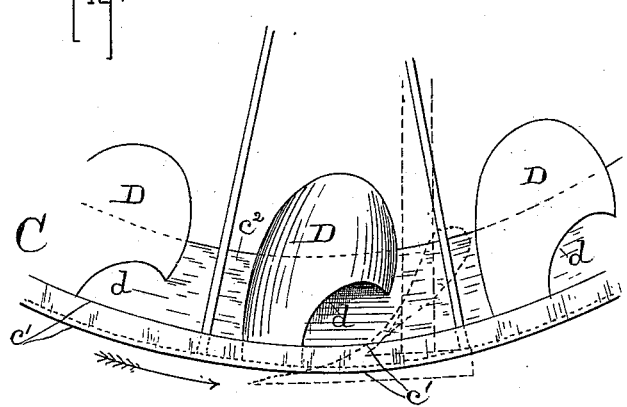
Witnesses,
G. H. Nurse
J. A. Bayless
Inventor,
George M. Wallace
By Dewey & Co.
Attys.

UNITED STATES PATENT OFFICE.

GEORGE M. WALLACE, OF YUBA CITY, CALIFORNIA.

WAGON-LOADER.

SPECIFICATION forming part of Letters Patent No. 550,426, dated November 26, 1895.

Application filed March 29, 1895. Serial No. 543,709. (No model.)

*To all whom it may concern:*

Be it known that I, GEORGE M. WALLACE, a citizen of the United States, residing at Yuba City, Sutter county, State of California, have invented an Improvement in Wagon-Loaders; and I hereby declare the following to be a full, clear, and exact description of the same.

My invention relates to that class of earth-handling machines variously termed "excavators," "ditch-diggers," "levee-builders," &c., and to which on account of the special object of my machine I have applied the term "wagon-loaders," for that it is intended primarily as a simple and practicable means of loading a wagon with dirt, whether in the progress of excavating for ditch-making or levee-building or the transportation of dirt from one place to another to consummate a work either at the beginning or at the end.

My machine belongs to that special class of these devices in which one of the wheels of the machine is a large one and is provided with a series of receptacles adapted to receive the earth from a plow below and to raise it to a point above, where it is delivered to the devices by which its final disposition is made.

My invention consists in the novel details of construction and arrangement of the dirt-receiving buckets of the carrying-wheel, the gates or doors by which their discharge is controlled, the means for automatically operating said gates or doors and for throwing said operating mechanism into and out of action, and other details, all of which I shall hereinafter fully describe and specifically claim.

The object of my invention, as before stated, is to provide a simple and operative machine for rapidly and economically loading a wagon with dirt, though it is to be understood that the machine can be applied to other uses to which said machines are usually put—such as excavating, ditch-making, and levee-building.

Referring to the accompanying drawings for a more complete explanation of my invention, Figure 1 is a perspective view of my wagon-loader. Fig. 2 is a plan of same. Fig. 3 is a vertical central cross-section. Fig. 4 is a detail showing the shape of the pockets or buckets from the inside. Fig. 5 is a detail of the plow-adjusting mechanism.

A is the frame of the machine, of any suitable character. It is mounted upon one side upon the wheel B, which is preferably a swiveled one adapted to be raised and lowered in order to keep the machine upon a side hill. This adjustment may be accomplished in any suitable manner; but I have here shown as the best means the stem $b$ of the swivel-wheel connected by a stud $b'$ with a slotted cam-arm $b^2$ of a pivoted lever $b^3$, adapted to engage a quadrant rack $b^4$. By the movement of this lever the cam-arm will raise and lower the shank or stem of the swivel-wheel to effect the vertical adjustment of the frame and keep it in proper position upon sidling ground. The other side of the frame A is mounted upon a large wheel C, which forms the carrier and elevator for the dirt. The periphery of this wheel is bounded on the inside by a narrow flange $c'$ and on the outer side by a wide flange $c^3$, so that a chamber is formed in said periphery into which the dirt is thrown by means of the plow P, to be hereinafter described.

Secured within the chambered periphery of the wheel C are the pockets or buckets D. These are arranged in an annular series, each separated from the other, and they may be in any suitable number and of any suitable size. The shape of each may be best described by likening it to the forward portion of a shoe, the entrance $d$ to which is entirely open on one side—namely, in the direction of rotation of the wheel—so that the dirt, which is thrown by the plow into the chambered periphery of the wheel between each pair of pockets or buckets, will fall by gravity into the opening or entrance thereof as said pocket or bucket proceeds upon its uprising course. The back or outer portion of the shoe-like pocket is formed and closed by the outer flange $c^2$ of the wheel; but the toe or point of said pocket projects about an equal distance beyond said flange and this portion is covered by a gate or door E, there being one such gate or door for each pocket or bucket. Each gate or door is pivoted at the point $e$, and each is controlled by a spring $e'$, which holds it in a closed position over the discharge-point of the pocket or bucket, and in this position each door or gate is properly limited by a suitable stop $e^2$ at the end, and each is properly guided by an overlying strap $e^3$.

Supported by a frame F, rising from the main frame A, is a discharge-chute G, the upper end of which lies directly under the point or discharge end of each pocket or bucket as it arrives at the uppermost limit of its rotation, whereby it is enabled to receive the dirt therefrom.

Pivoted upon the frame F is a curved cam-track H, which is adapted to be swung through an arc in a vertical plane by means of a bell-crank lever I, pivoted to the main frame at $i$, said lever being connected at one of its ends with the cam-track and at the other end with a lever J, controlled by a rack $j$, and within reach of the driver upon his seat S. Upon each door or gate is a pin or stud $e^4$, which, in practice, had best be in the form of a roller or other antifriction contact. Now when the cam-track H is thrown up to a vertical position close to the wheel, it lies in the path of the movement of the contact studs or pins $e^4$ of the doors or gates, and each one of these, coming in contact with said track successively, will, in traveling up and over it by its contact therewith, turn the door or gate about its pivotal point $e$, thereby opening the discharge end of the pocket or bucket, so that the latter will deliver its charge of dirt directly into the chute. Thus each pocket or bucket is opened as it comes to the cam-track, and its contents discharged into the chute; but as the cam-track has an appreciable diameter, it is plain that when thrown up to its operative position one or more of the studs or pins $e^4$ of the doors or gates will be within its circumference, and in order to allow these to pass out by the cam-track, the latter is notched or cut out at $h$, so that the pins or studs travel right through it. When the cam-track is swung outwardly away from the wheel it is not in the path of movement of the pins or studs of the doors or gates, and the latter pass by without contact, thereby providing for transporting the machine without causing it to operate.

The plow P, heretofore mentioned, is of any suitable form, supported from the frame A alongside of the inner edge of the carrier-wheel C and so turned that its moldboard will direct the earth over the narrow inner flange of said wheel and into the chamber of its periphery, whereby it will enter the pockets or buckets. The vertical adjustment of this plow to lower it more or less into the ground or to raise it entirely out therefrom may be effected by any suitable means, those here shown being a vertically-guided standard $p$ of the plow braced by a forwardly-extending link $p'$, said standard having at its upper end a stud $p^2$, playing in a slotted cam-arm $p^3$ of a lever $p^4$, engaging a rack $p^5$, and within reach of the driver on his seat S.

The shape of the pockets or buckets D is such that the earth entering them is kept in motion and loose throughout its entire progress, as it is continually working to the outside of said pocket or bucket, and when the latter gets to its uppermost position the dirt is down in the very toe or discharge-point thereof and will be easily delivered without tendency to clog or stick.

In wagon-loading the wagon is driven alongside the machine and accompanies it while receiving the dirt from the chute G.

Having thus described my invention, what I claim as new, and desire to secure by Letters Patent, is—

1. In a machine for wagon loading, excavating, &c., the combination, of a carrier wheel having inner and outer flanges forming a chambered periphery, a series of shoe-like pockets or buckets in said periphery having entrances in the direction of the rotation of the carrier, gates or doors pivotally secured to the outer flange of the wheel, and controlling the discharge of the buckets, and a cam like surface in the path of the gates or doors adapted to automatically open the same during the rotation of the wheel.

2. In a machine for wagon loading, excavating, &c., the combination of the carrier wheel having a flange upon the inside of its periphery, and another upon its outside whereby a chamber is formed in said periphery, the series of shoe-like pockets or buckets in said chambered periphery having entrances in the direction of rotation of the carrier, the bottoms or outer sides of said pockets or buckets being partially and permanently covered and formed by the outer flange of the chambered periphery, suitable gates or doors secured to the wheel and controlling the remaining or discharge portion of said pockets or buckets, and means for actuating said gates or doors to open and close them.

3. In a machine for wagon loading, excavating, &c., the combination of the carrier wheel having an annular interior chamber formed in its periphery, a series of pockets or buckets arranged in said periphery and adapted to successively receive and elevate the dirt, said pockets or buckets having their entrances presented in the direction of the rotation of the wheel, a spring-controlled normally closed gate or door controlling the discharge of the contents of each of said pockets or buckets, said gates or doors being pivoted to the carrier wheel, and a means in the path of projections of the gates or doors by which the latter are caused to successively open to permit the discharge of the contents of the pockets or buckets.

4. In a machine for wagon loading, excavating, &c., the combination of the carrier wheel, a series of pockets or buckets arranged in its periphery and adapted to successively receive and elevate the dirt, a spring-controlled normally closed gate or door controlling the discharge of the contents of each of said pockets or buckets, said gates or doors being pivoted to the carrier wheel, and each having a contact pin or stud and a cam track upon which the pins or studs impinge whereby the gates or doors are caused to successively open to permit the discharge of the contents of the pockets or buckets.

5. In a machine for wagon loading, excavating, &c., the combination of the carrier wheel, a series of pockets or buckets arranged in its periphery and adapted to successively receive and elevate the dirt, a spring-controlled normally closed gate or door controlling the discharge of the contents of each of said pockets or buckets, said gates or doors being pivoted to the wheel, and each having a contact pin or stud, a pivoted or swinging cam track against which the pins or studs impinge whereby the gates or doors are caused to successively open to permit the discharge of the contents of the pockets or buckets, and means for throwing said cam track into and out of the path of movement of the pins or studs of the doors or gates.

6. In a machine for wagon loading, excavating, &c., the combination of the carrier wheel, a series of pockets or buckets arranged in its periphery and adapted to successively receive and elevate the dirt, a spring-controlled normally closed gate or door controlling the discharge of the contents of each of said pockets or buckets, said gates or doors being pivoted to the wheel, and each having a pin or stud, a swinging cam track adapted to be thrown into and out of the path of said pins or studs whereby the gates or doors are caused to successively open to permit the discharge of the contents of the pockets or buckets, said cam track having a notch or opening in one side to permit the passage of those pins or studs caught within its circumference when thrown up, and means for swinging the cam track.

7. A machine for wagon loading, excavating, &c., consisting of a wheeled frame, one of the wheels of which is formed with a chambered periphery, a series of shoe-like pockets or buckets in said periphery having entrances in the direction of rotation of the wheel, pivoted spring-controlled normally closed doors or gates controlling the discharges of said pockets outwardly and having contact pins or studs, the adjustable cam track with which these pins or studs engage to open the doors or gates, the discharge chute into which each pocket or bucket is adapted to deliver its contents, and the plow carried by the main frame and adapted to turn the dirt over into the chambered periphery of the carrier wheel.

8. The means for adjusting the frame of the machine, consisting of a swivel wheel, having the vertically adjustable stem, a stud projecting at right angles to the stem, and a lever pivoted at one end to the frame and having its opposite end formed as an operating handle said lever having projecting from it at a point between its fulcrum and handle portion a curved slotted arm in which the stud on the stem operates.

9. The means for adjusting the plow of the machine consisting of the vertically guided standard of said plow, having a stud at its upper end, and a lever fulcrumed at one end to the frame and with its opposite end terminating in a handle, said lever having a curved slotted arm projecting from it at a point between its opposite ends, in the slot of which the stud on the plow standard operates.

In witness whereof I have hereunto set my hand.

GEORGE M. WALLACE.

Witnesses:
K. S. MAHON,
T. L. SMITH.